(12) United States Patent
Puttagunta et al.

(10) Patent No.: US 11,303,524 B2
(45) Date of Patent: Apr. 12, 2022

(54) NETWORK BANDWIDTH CONFIGURATION

(71) Applicant: HEWLETT PACKARD ENTERPRISE DEVELOPMENT LP, Houston, TX (US)

(72) Inventors: Krishna B. Puttagunta, Roseville, CA (US); Rupin T. Mohan, Andover, MA (US); Vivek Agarwal, Westborough, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 368 days.

(21) Appl. No.: 16/266,587

(22) Filed: Feb. 4, 2019

(65) Prior Publication Data

US 2020/0252290 A1    Aug. 6, 2020

(51) Int. Cl.
| | |
|---|---|
| *G06F 15/173* | (2006.01) |
| *H04L 41/0893* | (2022.01) |
| *H04L 41/5054* | (2022.01) |
| *G06F 9/455* | (2018.01) |
| *H04L 12/46* | (2006.01) |

(52) U.S. Cl.
CPC ...... *H04L 41/0893* (2013.01); *G06F 9/45558* (2013.01); *H04L 12/4641* (2013.01); *H04L 41/5054* (2013.01); *G06F 2009/45595* (2013.01)

(58) Field of Classification Search
CPC ............. H04L 41/0893; H04L 12/4641; H04L 41/5054; G06F 9/45558; G06F 2009/45595

USPC ........................................................ 709/223
See application file for complete search history.

(56) References Cited

U.S. PATENT DOCUMENTS

| | | | |
|---|---|---|---|
| 9,065,734 B2 | 6/2015 | Zhang | |
| 9,307,018 B2 | 4/2016 | DeCusatis et al. | |
| 9,571,457 B1 | 2/2017 | Hoy et al. | |
| 9,742,490 B1 | 8/2017 | Anand et al. | |
| 2013/0326516 A1* | 12/2013 | Hill | H04L 63/0272 718/1 |
| 2014/0109088 A1* | 4/2014 | Dournov | G06F 9/44505 718/1 |
| 2015/0242244 A1* | 8/2015 | Jackson | G06F 9/4881 718/104 |
| 2017/0181038 A1* | 6/2017 | Yeddala | H04L 43/0876 |

OTHER PUBLICATIONS

Dian Shen et al., "AppBag: Application-Aware Bandwidth Allocation for Virtual Machines in Cloud Environment," Aug. 2016, pp. 1-3.

(Continued)

*Primary Examiner* — Atta Khan
(74) *Attorney, Agent, or Firm* — Trop, Pruner & Hu, P.C.

(57) ABSTRACT

Examples herein relate to managing data and network bandwidth. In an example implementation, a method includes monitoring a first location having a local volume and a local gateway and monitoring a second location having a first remote volume and a remote gateway. The method also includes determining a bandwidth requirement for a second remote volume at the second location and configuring the local gateway and the remote gateway for the bandwidth requirement. The method also includes adjusting the local gateway and the remote gateway when the bandwidth requirement changes.

20 Claims, 7 Drawing Sheets

(56) References Cited

OTHER PUBLICATIONS

Benoit Hudzia, "How to Build a Secure Tunnel from Your On-Premises Data Center to Amazon Cloud", available online at <https://www.stratoscale.com/blog/cloud/build-secure-tunnel-on-prem-data-center-amazon-cloud/>, Nov. 21, 2016, 7 pages.
Microsoft, "ExpressRoute pricing", available online at <https://web.archive.org/web/20190110152837/https://azure.microsoft.com/en-us/pricing/details/expressroute/>, Jan. 10, 2019, 5 pages.

* cited by examiner

NETWORK BANDWIDTH CONFIGURATION

BACKGROUND

Generally, datacenters are facilities having a number of networked computing and storage devices that are used to organize, store, process, and otherwise disseminate data. Data may also be stored using a cloud data service. Cloud-based computing services are generally a remote version of a datacenter, where the data is stored away from a local premises. The data in the cloud may then be accessed through the Internet. In certain circumstances, data may be deployed using hybrid cloud deployment, where workloads may be deployed either on premise or in the cloud. In a hybrid cloud computing environment, a private cloud that is hosted at an onsite location and a public cloud hosted at a geographically separate location may be connected, thereby allowing for the exchange of data therebetween.

DETAILED DESCRIPTION

One or more examples are described in detail with reference to the accompanying figures. For consistency, like elements in the various figures are denoted by like reference numerals. In the following detailed description, specific details are set forth in order to provide a thorough understanding of the subject matter claimed below. In other instances, well-known features to one of ordinary skill in the art having the benefit of this disclosure are not described to avoid obscuring the description of the claimed subject matter.

In hybrid cloud computing environments, data is moved between onsite locations and offsite locations. The onsite locations may have numerous computing and storage devices and may include datacenters. Offsite locations may be geographically separate from the onsite locations and include cloud-based computing services. During operation, onsite locations may store local, volumes that may subsequently be mounted to workloads or virtual machines in the cloud-based computing services.

As changes are made to the onsite and offsite locations, the speed of the connection therebetween may decrease. In order to maintain a connection of a desired speed, the bandwidth of the connection may be adjusted. Systems and methods disclosed herein may provide an architecture that allows the connection between onsite and offsite locations to be monitored. In response to a change in the environment of either the onsite location or the offsite location, aspects of the onsite location and the offsite location may be adjusted in order to provide a desired connection and/or speed of connection therebetween.

Figure 1:
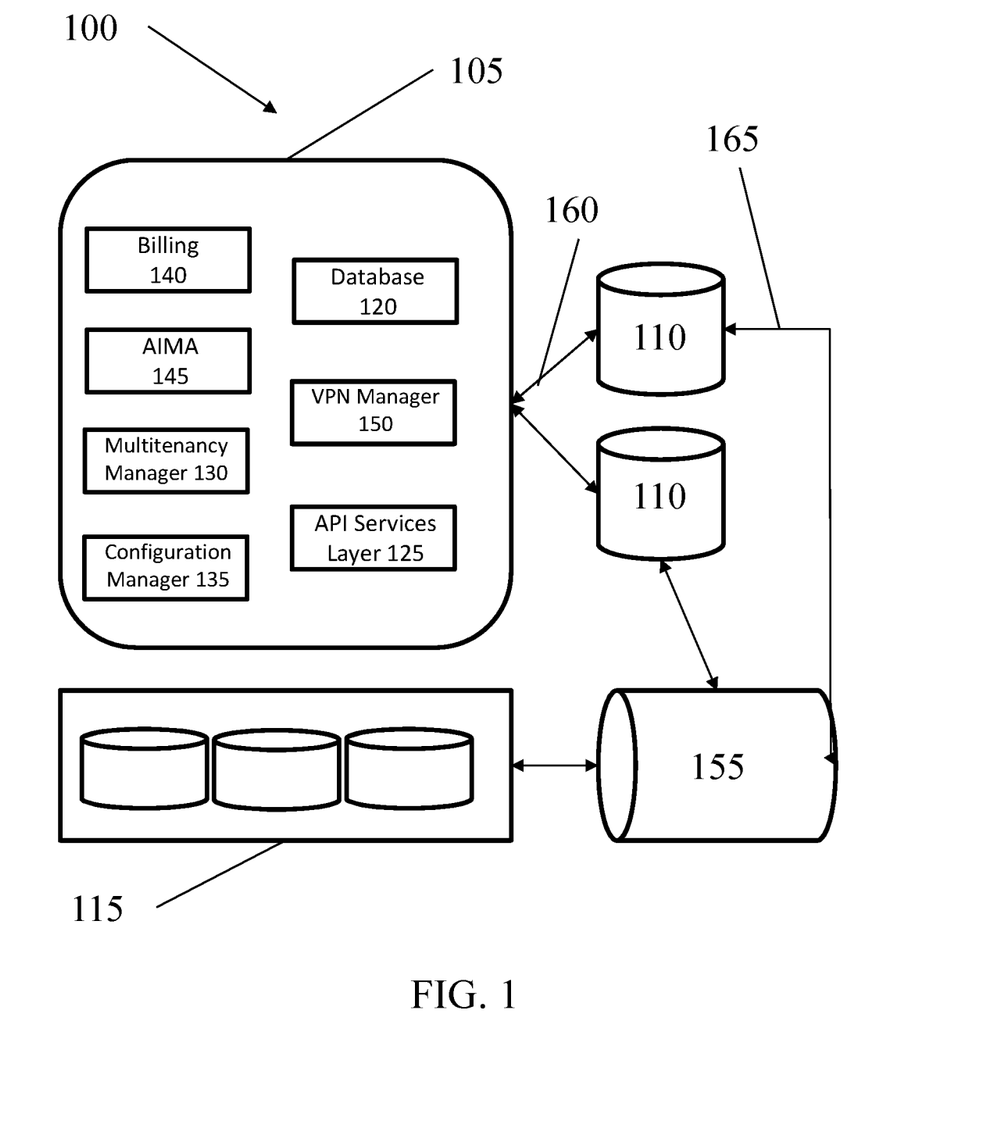
FIG. 1 is a schematic representation of a system for managing data, according to one or more examples of the present disclosure.

Turning to FIG. 1, a schematic representation of a system for managing data according to one or more examples of the present disclosure is shown. In this example, system 100 includes an orchestrator 105 that is operatively connected to one or more cloud-based computing services 110. Orchestrator 105 and cloud-based computing services 110 are also operatively connected to a local storage 115. The components of system 100 are discussed in detail below.

Cloud-based computing services 110 may refer to a type of Internet-based computing, where services, such as servers, storage, applications, virtual machines, and the like, are delivered to another location through the Internet as an on-demand service. Cloud-based computing services 110 may be located in areas geographically separate from local storage 115 and/or orchestrator 105. In operation, cloud-based computing services 110 may spawn virtual machines, which may run programs and applications and may be implemented by, for example, software emulation or hardware virtualization.

In certain examples, local storage 115 may include one or more storage systems having a plurality of memories, thereby allowing for the storage of large quantities of data. For example, local storage 115 may include a high-speed, full-mesh passive interconnect that joins multiple controller nodes to form a cache-coherent, mesh-active cluster. The low-latency interconnect may thereby allow for coordination among controller nodes and provide a simplified software model for controlling local storage 115. Additionally, each controller node may have one or more paths to various hosts, either directly or over a storage area network. The clustering of the nodes may also allow local storage 115 to present hosts with a single, highly available system that may allow external devices to access volumes stored on local storage 115 over host-connected ports, even if the physical storage for the data is connected to a different controller node. Local storage 115 may further include devices that allow data to be stored and subsequently accessed by computing devices.

Orchestrator 105 may include a software application that runs as either a virtual machine or a switch embedded container. Orchestrator 105 may be implemented as a computer-readable medium storing instructions that are executable by a hardware processor. The machine-readable storage medium may include both volatile and nonvolatile, removable and non-removable media, and may be any electronic, magnetic, optical, or other physical storage device that contains or stores executable instructions, data structures, program module, or other data accessible to a processor. In other implementations, orchestrator 105 may be implemented as electronic circuitry or a logical operation.

Orchestrator 105 may include various functionalities including, for example, a database 120, an application programming interface surface layer ("API") or a command line interface ("CLI") 125, a multitenancy manager 130, a configuration manager 135, a billing manager 140, an authentication/identify management/authorization module ("AIMA") 145, a virtual private network ("VPN") gateway manager 150, as well as other components not specifically listed herein.

Database 120 may include a centralized collection of data that is accessible by orchestrator 105 and may include data about other modules of orchestrator 105, as well as data about cloud-based computing services 110 and local storage 105. Database 120 may be replicated for high availability solutions, thereby allowing database 120 to be available even if certain aspects of system 100 become unavailable during either planned or unplanned outages.

With respect to an API/CLI surface layer interface 125, an API refers to a part of a computing device that receives requests and sends responses. For example, an API may include a software intermediary that allows two other applications or computing devices to communicate, thereby allowing data and/or instructions to be transferred therebetween. A CLI refers to a way a user interacts with a software program where the user issues commands to the software program in the form of successive lines of text. CLIs may also be referred to as command-line user interfaces, console user interfaces, and/or character user interfaces.

Multitenancy manager 130 refers to a software module that allows a single instance of software to serve multiple customers, which may be referred to as tenants. Tenants refer to a group of customers that share common access with specific privileges to the software instance. In cloud computing, the multitenancy manager may thereby provide every tenant a dedicated share of the software instance including its data, configuration, user management, and client functionality and/or non-functionality. Additionally, cloud computing multitenancy provides for separation between tenants running software applications in a shared environment. In such a circumstance, the resources controlled by one tenant are physically or logically separated and secured from other tenants.

Configuration manager 135 refers to a module that allows for components of orchestrator 105 to be modified depending on the requirements of a particular operation. For example, configuration manager 135 may be used to configure aspects of orchestrator 105, cloud-based computing services 110, and/or local storage 115.

Billing manager 140 refers to a module that tracks time and billing instances for particular products and services that may be provided by orchestrator 105. Billing manager 140 may further track system cycles and resources deployed within system 100. Billing manager 140 may further provide for billing on a pay-per-use basis, the cost of which is determined based on the amount of bandwidth used.

The AIMA module 145 refers to a module that provides for authentication of users, as well as identify management for the users. AIMA module 145 may further provide authorization functionality that may be used to control the types of actions a particular user may perform within orchestrator 105. For example, AIMA 145 may be used to restrict functionality of particular users, while allowing other users to have different levels of access to functions and data within orchestrator 105, cloud-based computing services 110, and/or local storage 115.

VPN gateway manager 150 may be used to control a VPN 155 between cloud-based computing services 110 and local storage 115. VPN 155 may be used to extend a private network across a public network, thereby allowing data to be sent between the networks as if the networks were directly connected. VPN gateway manager 150 may thereby provide instructions to a VPN gateway (not illustrated), allowing for encrypted data to be sent between cloud-based computing services 110 and local storage 115.

In operation, orchestrator 105 is operatively connected to cloud-based computing services 110 through one or more control paths 160 (only one path labeled in FIG. 1 for illustration clarity). Control paths 160 may allow for either wired or wireless communication between orchestrator 105 and cloud-based computing services 110, and as such, orchestrator 105 may communicate through APIs to both send instructions and receive data. Cloud-based computing service 110 may be connected to local storage 105 through VPN 155. In order to transmit data between local storage 115, VPN 155, and cloud-based computing service 110, an internet small computer systems interface ("iSCSI") mount data path 165 may be established.

An iSCSI refers to an Internet Protocol ("IP") based storage networking standard for linking data storage facilities. An iSCSI may thereby provide block-level access to storage devices by carrying commands over a TCP/IP network, thereby allowing data transfers and the ability to manage computing storage devices over relatively long distances. Additionally, iSCSI may be used to transmit data over local area networks ("LANs"), wide area networks ("WAN"), and/or the Internet and may thereby allow location-independent data storage and retrieval.

During operation, volumes may be created on local storage 115. The volumes may then be mounted to workloads or virtual machines in cloud-based computing services 110. During this process, orchestrator 105 may monitor the communication between local storage 115 and cloud-based computing services 110 to determine whether there is sufficient bandwidth therebetween. Orchestrator 105 may also continue to monitor local storage 115 and cloud-based computing services 110 to determine whether bandwidth remains sufficient as operating conditions change. In addition to monitoring bandwidth, orchestrator 105 may also monitor other aspects of local storage 115 and cloud-based computing services 110, such as processing speeds, data transfer rates, operation timing, and the like.

Orchestrator 105 may also provide for fine-tuning of the connection between local storage 115 and cloud-based computing service 110. For example, orchestrator 105 may automatically adjust bandwidth between local storage 115 and cloud-based computing service 110 in response to a change in one or more of local storage 115 and/or cloud-based computing service 110. The change may occur as a result of for example, additional virtual machines being added to cloud-based computing services 110. Other changes may include modifications to local storage 115 and/or the connections between local storage 115 and cloud-based computing services 110. Specific examples of deployment, monitoring, and adjusting system 100 are explained in detail with respect to FIG. 2.

Figure 2:
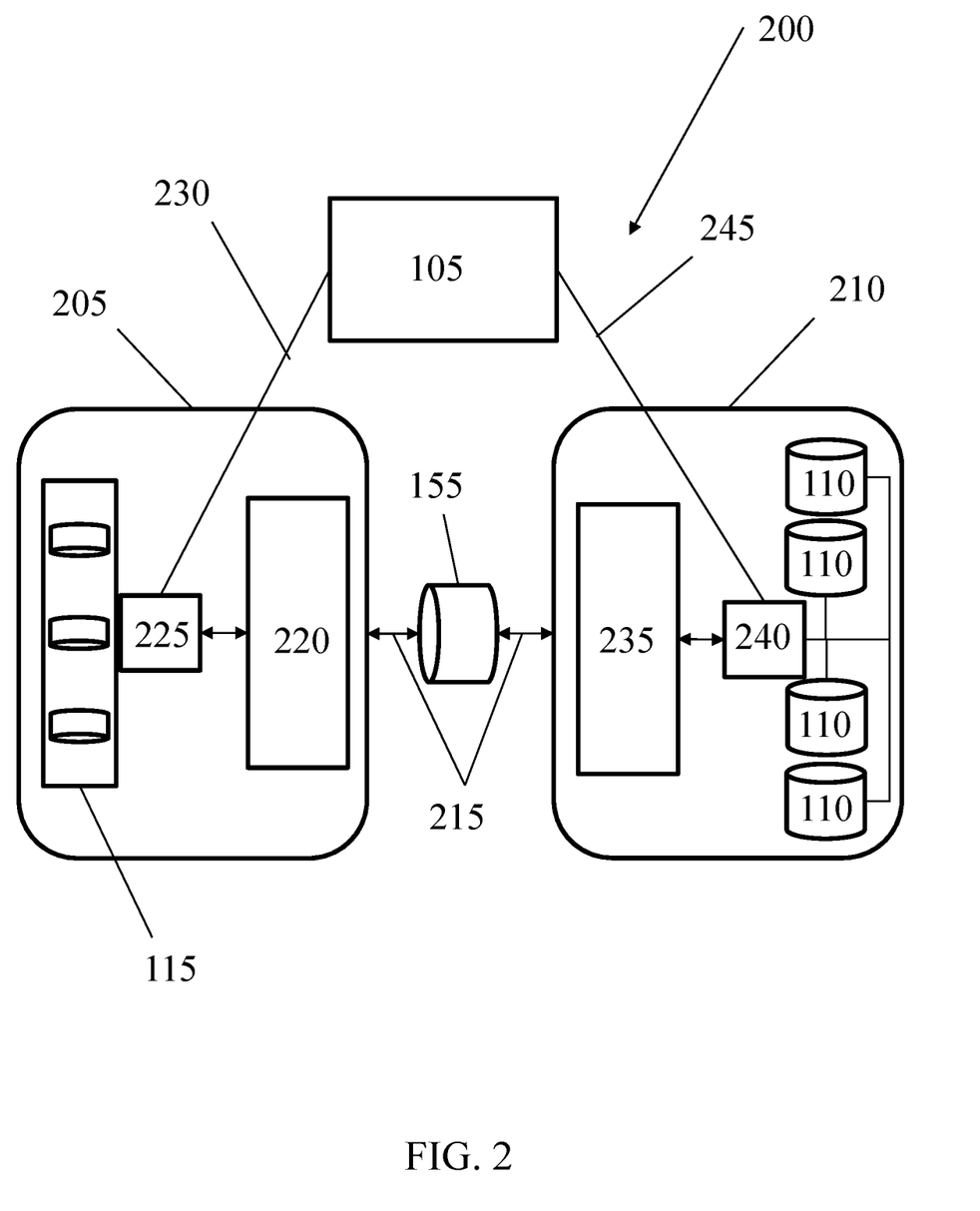
FIG. 2 is a schematic representation of a system for managing data, according to one or, more examples of the present disclosure.

Referring to FIG. 2, a schematic representation of a system 200 for managing data according to one or more examples of the present disclosure is shown. System 200 generally includes architecture analogous in many respects to the architecture discussed above with respect to system 100 of FIG. 1. Accordingly, a detailed description of each component is excluded for clarity in explaining the operation of system 200. System 200 includes an orchestrator 105 that is connected to an onsite location 205 and an offsite location 210. Orchestrator 105 includes the functionality discussed above and is operatively connected to onsite location 205 and offsite location 210 through one or more wired or wireless connections 215. Orchestrator 105 may be located geographically close to onsite location 205 or may be located geographically separated from onsite location 205, such as being hosted in the cloud. Offsite location 210 may be located geographically separated from onsite location 205, as well as being geographically separated from orchestrator 105.

Onsite location 205 may include a local storage 115 Local storage 115 may include one or more storage devices, such as those discussed above, thereby allowing local storage 115 to store local volumes for deployment to offsite location 210.

Onsite location 205 may further include a gateway 220 that is connected to a gateway manager 225. Gateway 220 may define what is internal and what is external to a network (not independently illustrated) and may thereby allow communication between two or more networks. As such, when computing devices at onsite location 205 communicate with computing devices outside onsite location 205, the computing devices at onsite location 205 are configured with gateway 220 to gain access outside the onsite network. Gateway manager 225 may provide the ability to monitor and manage one or more APIs, such as gateway API 230. Upon notification of a change from gateway API 230 to gateway manager 225, gateway manager 225 may provide instructions to reconfigure gateway 220. Thus, as instructions are provided from orchestrator 105, the operational parameters of gateway 220 may be adjusted.

Offsite location 210 may include one or more cloud-based computing services 110. In this example, cloud-based computing services 110 are illustrated located at a single offsite location 210, however, in other implementations, cloud-based computing services 110 may be located geographically separated from each other. As such, multiple cloud-based computing services may be located at different offsite locations 210, which are geographically separated from onsite location 205 and/or orchestrator 105.

Offsite location 210 may also include a remote gateway 235 and a cloud monitor 240. Remote gateway 235 includes similar functionality to gateway 220 of onsite location 205. Cloud monitor 240 may provide the ability to monitor and manage one or more APIs, such as cloud monitor API 245. Upon notification of a change from cloud monitor API 245 to cloud monitor 240, cloud monitor 240 may provide instructions to reconfigure remote gateway 235. Thus, as instructions are provided from orchestrator 105, the operational parameters of remote gateway 240 may be adjusted.

Onsite location 205 and offsite location 210 may be connected through a VPN 155. As such, gateway 220 of onsite location 205 and remote gateway 235 of offsite location 210 may be operatively connected so that data may be exchanged therebetween.

In operation, orchestrator 105 may be used to create local volumes on local storage 115. Orchestrator 105 may further provide instructions via gateway API 230 to mount one or more volumes from local storage 105 to cloud-based computing services 110. The local volumes may then be sent through VPN 155 to cloud-based computing services 110 and mounted as a workload or a as a virtual machine. Orchestrator 105 may then monitor onsite location 105 and offsite location 110 through gateway manager 225 and cloud monitor 240, respectively. The monitoring may include determining bandwidth requirements or other performance factors. Orchestrator 105 may then make changes to aspects of onsite location 205 and/or offsite location 210 in response to changes to either onsite location 205 and/or offsite location 210.

As an example, if more applications are to be deployed to cloud-based computing services 110, orchestrator 105 may provide instructions to spawn additional virtual machines in cloud-based computing services 110 with matching local volumes in local storage 115. Accordingly, the bandwidth may be recalibrated, which may involve adjusting one or more VPN connections. To adjust the bandwidth, orchestrator 105 may communicate with gateway manager 225 and cloud monitor 240 to adjust gateway 220 and/or remote gateway 235. The communication between orchestrator 105 and gateway manager 225 and cloud monitor 240 may occur through gateway APIs 230 and cloud monitor APIs 245, respectively.

Orchestrator 105 may further track the number of virtual machines that are spawned, as well as the volumes provisioned to each virtual machine using gateway APIs 230 and cloud monitor APIs 245. Orchestrator 105 may also assign weights to each connection between onsite location 205 and offsite location 210. Thus, when a new application or virtual machine is spawned and/or a new volume is assigned, orchestrator 105 may determine whether the bandwidth to the application or the virtual machine is sufficient, based at least in part on the assigned weights, or if additional bandwidth is desirable. Orchestrator 105 may then open additional connections between onsite location 205 and offsite location 210 if additional bandwidth is desirable.

For example, gateway manager 225 and cloud monitor 240 may provide information to orchestrator 105 through gateway APIs 230 and/or could monitor APIs 245. The information provided to orchestrator 105 may be automatically provided by a service level agreement ("SLA") and/or in response to a change within system 200. In one implementation, a change to system 200 may include the addition of a new virtual machine. Cloud monitor 240 may inform orchestrator 105 that a new virtual machine is located in cloud-based computing services 110. Orchestrator 105 may then determine whether there is enough available bandwidth between gateway 220 and remote gateway 235 for the new virtual machine. If the bandwidth is sufficient, orchestrator 105 may take no action. If the bandwidth is not sufficient, orchestrator 105 may instruct gateway manager 225 and/or cloud monitor 240 to open additional connections between gateway 220 and remote gateway 235. In another implementation, orchestrator 105 may instruct gateway manager 225 and/or cloud monitor 240 to adjust the network link speed, thereby increasing the maximum data transfer speeds between gateway 220 and remote gateway 235.

Weights may also be assigned to specific applications, thereby allowing orchestrator 105 to determine bandwidth and adjust the connections accordingly. Orchestrator 105 may further determine what connection speeds to use based on application weights and subsequently select a connection speed between onsite location 205 and offsite location 210 using gateway APIs 230 and/or cloud monitor APIs 245. After the connections are determined and/or adjusted, orchestrator 105 may continue to monitor onsite location 205 and offsite location 210, making additional adjustments as changes occur. In certain implementations, the connections may be reduced when bandwidth requirements decrease, such as when virtual machines are removed.

Cloud monitor 240 may use cloud monitor APIs 245 to provide information to orchestrator 105. The cloud monitor APIs 245 used for monitoring may include one or more of the following parameters, DiskReadOps, DiskWriteOps, DiskWriteBytes, DiskRead Bytes, NetworkIn, NetworkOut, NetworkPacketsIn, NetworkPacketsOut, Number of new virtual machines, and/or AdditionalBandwidth.

DiskReadOps determines completed read operations from all instance store volumes available to the instance in a specified period of time. DiskWriteOps determines completed write operations to all instance store volumes available to the instance in a specified period of time. DiskWriteBytes determines the number of bytes written to all instance store volumes available to the instance. DiskReadBytes determines the number of bytes read from all instance store volumes available to the instance.

NetworkIn determines the number of bytes received on all network interfaces by the instance and identifies the volume of incoming network traffic to a single instance. NetworkOut determines the number of bytes sent out on all network interfaces by the instance and identifies the volume of outgoing network traffic from a single instance. NetworkPacketsIn determines the number of packets received on all network interfaces by the instance and identifies the volume of incoming traffic in terms of the number of packets on a single instance. NetworkPacketsOut determines the number of packets sent out on all network interfaces by the instance and identifies the volume of outgoing traffic in terms of the number of packets on a single instance.

The Number of new virtual machines determines the number of virtual machines that are currently running. AdditionalBandwidth determines the amount of change in bandwidth for running the existing virtual machines or new virtual machines being added.

Similarly, gateway manager 225 may use gateway APIs 230 to provide information to orchestrator 105 and orchestrator 105 may use gateway APIs 230 to provide instructions to gateway manager 225. The gateway APIs 230 used for monitoring may include one or more of the following parameters: Public, Private, AdditionalBandwidth, and/or TotalBandwidth. Public and Private refer to the type of network where data will be sent or received. AdditionalBandwidth refers to the change in bandwidth that may occur between networks. TotalBandwidth refers to the total amount of bandwidth that is available across selected networks.

By providing information to orchestrator 105 from the offsite location 210 and the onsite location 205, the orchestrator 105 may process the information and adjust aspects of offsite location 210 and/or onsite location 205 to provide sufficient bandwidth therebetween. Orchestrator 105 may further monitor offsite location 210 and/or onsite location 205 and provide updated instructions to offsite location 210 and/or onsite location 205 in response to a change to one or more of the locations. The updated instructions may thereby allow bandwidth and/or other aspects of offsite location 210 and/or onsite location 205 to be updated, allowing for improved communication therebetween.

By receiving information provided by the parameters discussed above from gateway manager 225 and cloud monitor 240, orchestrator 105 may have real time or substantially real time information indicating the number of packets passing between gateway 220 and remote gateway 235. When a change in the number of packets passing between gateway 220 and remote gateway 235 occurs, orchestrator may determine that a change to one or more components of onsite location 205 and/or offsite location 210 has been modified. For example, in one implementation, the packets transferred between gateway 220 and remote gateway 235 may have increased. Orchestrator 105 may thus determine that in order to provide efficient exchange of data between gateway 220 and remote gateway 235, additional connections in gateway 220 and remote gateway 235 should be opened. By opening additional connections, bandwidth may be increased, thereby allowing data to be transferred between onsite location 205 and offsite location 210 more efficiently. As orchestrator 105 receives information from gateway manager 225 and cloud monitor 235 on a relatively consistent basis, as changes to onsite location 205 and/or offsite location 210 occur, orchestrator 105 may make adjustments to allow for the efficient operation of onsite location 205 and/or offsite location 210. Methods for managing data, including the use of system 100 and system 200 are discussed in detail below.

Figure 3:
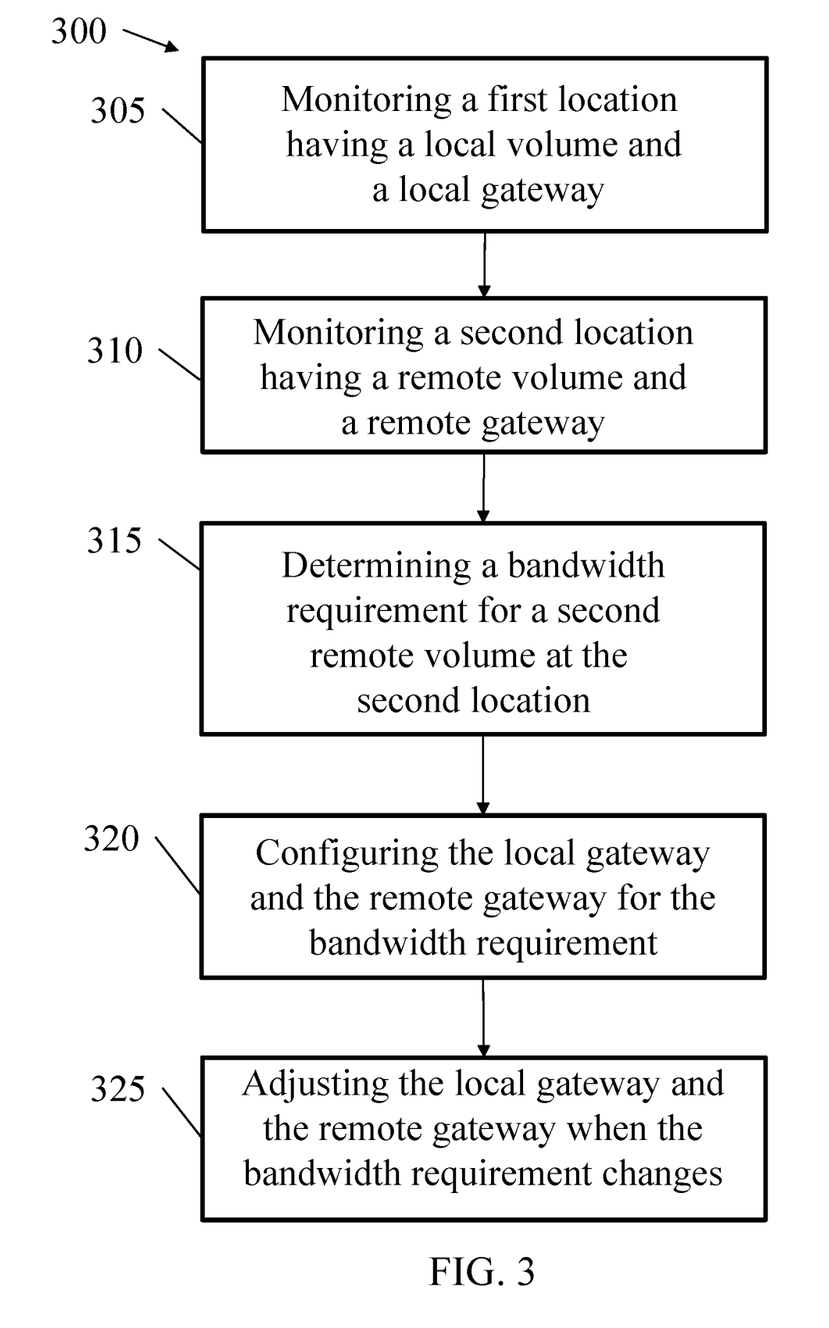
FIG. 3 is a flowchart depicting a method for managing data according to one or more examples of the present disclosure.

Referring to FIG. 3, a flowchart for a method 300 for managing data according to one or more examples of the present disclosure is shown. In this example, method 300 may include monitoring (block 305) a first location having a local volume and a local gateway. The first location may include an onsite location that has one or more local storage systems. The local storage systems may include low-latency local storage systems, such as those described above, thereby allowing large quantities of data to be locally stored. The local gateway may provide access between a network at the onsite location and external networks.

Monitoring the first location may include, for example, determining a local parameter. The local parameter may include a number of completed read operations, a number of completed write operations, a total number of bytes written during a period, a total number of by bytes read during the period, a number of bytes received, a number of bytes sent, a number of packets received, and a number of packets sent. The local parameter may also include an additional bandwidth and a total bandwidth.

The monitoring may be performed by an orchestrator having one or more attributes as previously discussed. The monitoring may include monitoring bandwidth requirements, i.e., overall bandwidth, and/or other performance related parameters that a particular network or set of networks experiences. Additionally, monitoring may further include communication between the orchestrator and a gateway manager located at the first location. Communication between the orchestrator and the gateway manager may include use of gateway APIs, which allow for the orchestrator to send and receive information to and from the local gateway. Communication between the orchestrator and the gateway manager may occur substantially continuously or may occur on an as needed basis.

For example, in certain operations orchestrator may send and/or receive information from the gateway manager in a set time sequence, such as every five seconds. In other operations, the orchestrator may send and/or receive information more frequently, less frequently, or only when certain conditions are met. Examples of conditions that may result in communication between the orchestrator and the gateway manager may include changes in bandwidth and/or changes in operational parameters at the first location, at a second location, or communication between the locations.

In operation, method 300 may further include monitoring (block 310) a second location having a remote volume and a remote gateway. The second location may be geographically separate from the first location. In certain examples, as set forth in detail above, the remote volume may be located on one or more cloud-based computing systems. Monitoring the second location may include determining a remote parameter. The remote parameter may include, for example, a number of new virtual machines and an additional bandwidth.

Monitoring the second location may be performed by the orchestrator, as explained above. The monitoring of the second location may further include communication between the orchestrator and a cloud monitor located at the second location. Communication between the orchestrator and the cloud monitor may include use of cloud monitor APIs, which allow for the orchestrator to send and receive information to and from the remote gateway. Communication between the orchestrator and the cloud monitor may occur substantially continuously or may occur on an as needed basis. Furthermore, communication between the orchestrator and the cloud monitor may include monitoring operational parameters that effect one or more devices located in the second location, such as storage systems, gateways, computing devices, and the like.

In operation, method 300 may further include determining (block 315) a bandwidth requirement for a second remote volume at the second location. The second remote volume may include an additional virtual machine that is created on one or more of the cloud-based computing systems. Depending on the size and/or configuration of the second remote volume, overall bandwidth requirements may increase or decrease. Determining the bandwidth may include using the cloud monitor and communicating information about the remote location to the orchestrator. For example, the cloud monitor may measure the amount and/or speed of data sent or received through the remote gateway. The orchestrator may then process the information received from the cloud monitor and determine the overall bandwidth requirements for communication between the first location and the second location.

In operation, method 300 may further include configuring (block 320) the local gateway and the remote gateway for the overall bandwidth requirement. In certain examples, changes to devices at the first location and/or the second location may result in a change to the overall bandwidth requirements for communication therebetween. In some instances, the bandwidth requirements may increase, such as by adding additional remote volumes thereby requiring greater bandwidth in order to maintain a desired speed of transference of data. In other instances, the bandwidth requirements may decrease, and as such, the local gateway and/or the remote gateway may be configured to prevent a waste of resources.

Configuring the local gateway may include providing instructions to the gateway manager through gateway APIs from the orchestrator. Similarly, configuring the remote gateway may include providing instructions to the cloud monitor through cloud monitor APIs. The configuring may further include changing one or more operational parameters, such as a number of connections and/or a network link speed, of the local gateway and/or the remote gateway.

In operation, method 300 may further include adjusting (block 325) the local gateway and the remote gateway when the bandwidth requirement changes. As the orchestrator continues to send/receive information from the gateway manager and the cloud monitor, the bandwidth requirements may require adjustments. Because the first location and the second locations are monitored, as discussed with respect to operational processes (blocks 305 and 310) above, changes to the speed of the transference of data therebetween may be determined. The local parameters and the remote parameters may inform the orchestrator as to the state of the connection between the first location and the second location. For example, by monitoring connection speed and/or number of packets transferred between the first location and the second location, the orchestrator may determine that the bandwidth is not sufficient. If the bandwidth between the first connection and the second connection is not sufficient, the orchestrator may determine how much additional bandwidth would improve the connection between the first location and the second location. The local gateway and the remote gateway may thus be adjusted to provide additional bandwidth between the first location and the second location. The adjusting (block 325) may thus occur dynamically in response to a change to the first location, the second location, or any infrastructure therebetween.

Changes to the bandwidth requirement may further occur as a result of a change to an existing workload, a new workload, and/or a new virtual machine. The changes may result in more or less desired bandwidth as determined by the orchestrator. Dynamically adjusting the onsite and/or offsite locations as a result of changes to the onsite and/or offsite locations may thereby allow for improved operability therebetween.

Figure 4:
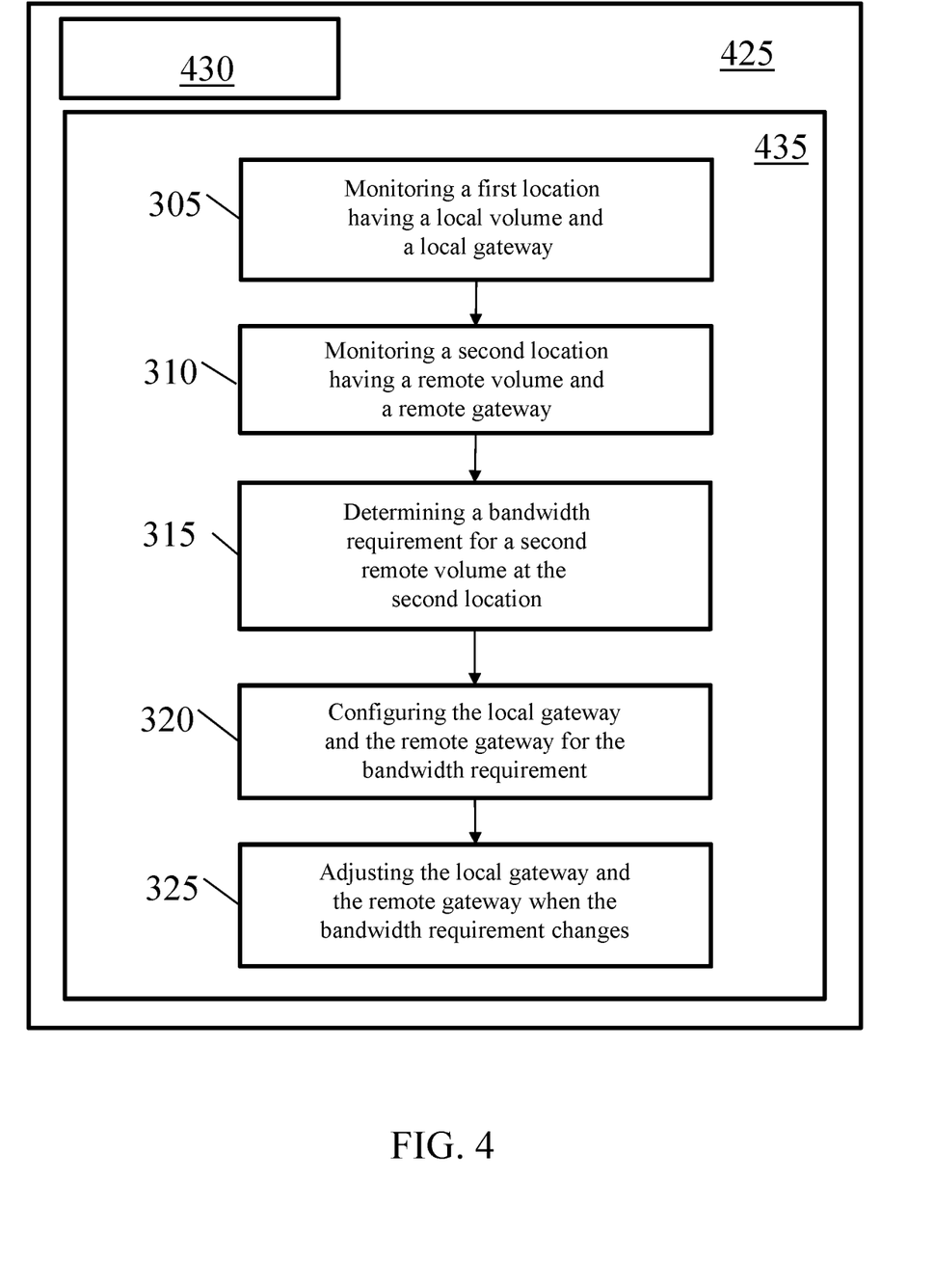
FIG. 4 is an example computing device with a hardware processor and accessible machine-readable instructions, according to one or more examples of the present disclosure.

Turning to FIG. 4, an example computing device with a hardware processor and accessible machine-readable instructions is shown in accordance with one or more examples of the present disclosure. FIG. 4 provides an example computing device 425, with a hardware processor 430, and accessible machine-readable instructions stored on a machine-readable medium 435 for managing data as discussed above with respect to one or more disclosed example implementations. FIG. 4 illustrates computing device 425 configured to perform the flow described in blocks 305, 310, 315, 320, and 325, discussed in detail with respect to FIG. 3. However, computing device 425 may also be configured to perform the flow of other methods, techniques, functions, or processes described in this disclosure. Computing device 425 may further be used as an orchestrator, thereby allowing the orchestrator to implement one or more aspects of the flow described in blocks 305, 310, 315, 320, and 325.

A machine-readable storage medium, such as 435 of FIG. 4, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory ("EPROM"), random access memory ("RAM"), non-volatile random access memory ("NVRAM"), optical disk, solid state drive ("SSD"), flash memory chips, and the like. The machine-readable storage medium may be a non-transitory storage medium, where the term "non-transitory" does not encompass transitory propagating signals.

Figure 5:
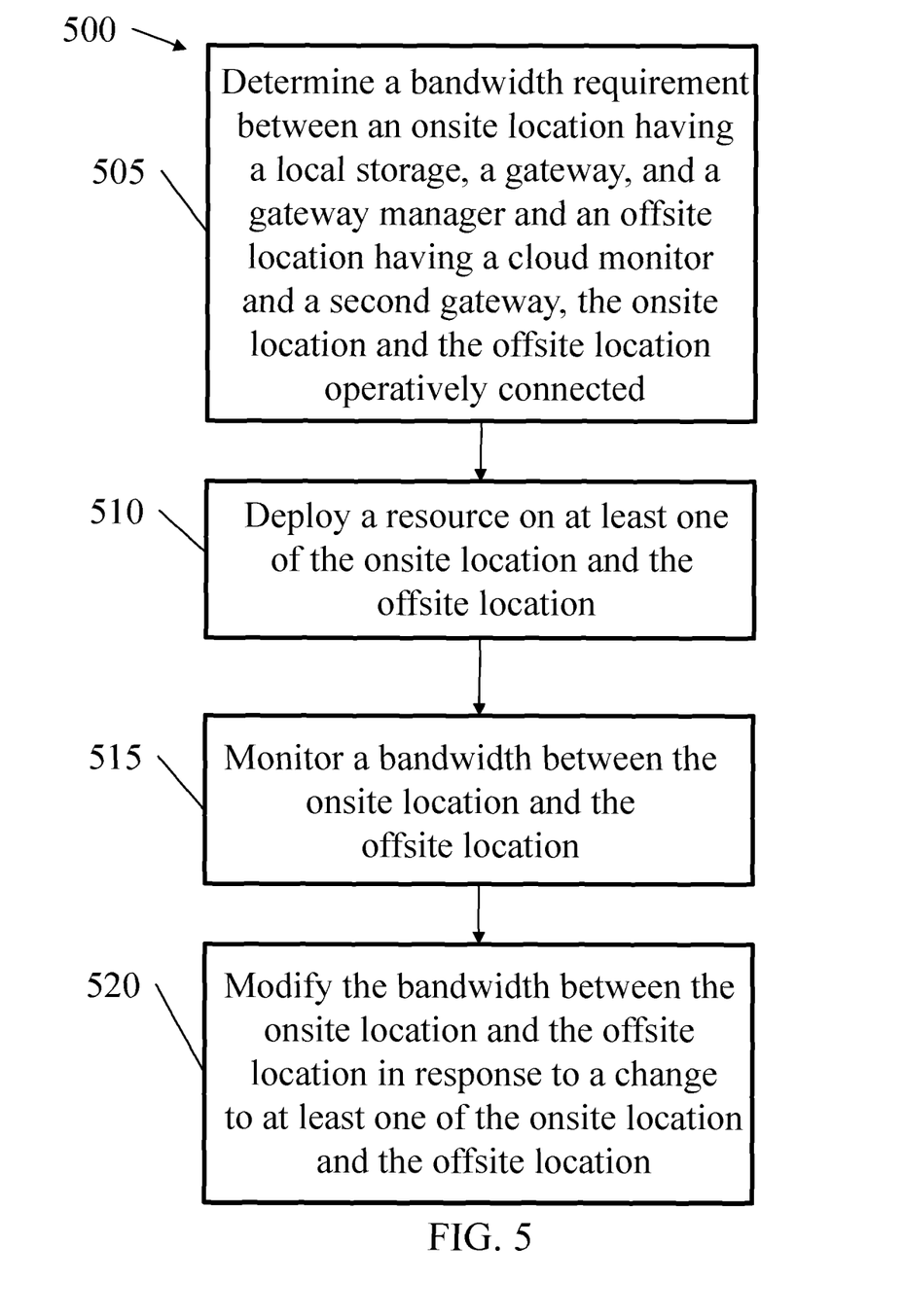
FIG. 5 is a flowchart depicting a method for managing data according to one or more examples of the present disclosure.

Turning to FIG. 5, a flowchart for a method 500 for managing data according to one or more examples of the present disclosure is shown. In operation, method 500 may include determining (block 505) a bandwidth requirement between an onsite location and an offsite location that are operatively connected. The onsite location may include a local storage, a gateway, and a gateway manager. The offsite location may include a cloud monitor and a second gateway. The onsite location and the offsite locations may be geographically separate, and as such, may be operatively connected through one or more wired or wireless connections.

In operation, method 500 may further include deploying (block 510) a resource on at least one of the onsite location and the offsite location. The resource may include a physical or virtual component within one or more computing devices. For example, the resource may include a local volume, a remote volume, a virtual machine, and the like. In one example, the resource may include a new virtual machine that is added at an offsite location. In another example, the resource may include a new local volume at the onsite location. Furthermore, in certain examples, more than one resource may be deployed during operation.

Deploying may include use of an orchestrator that sends and receives information between the onsite location and the offsite location. The orchestrator may send/receive information to or from the onsite location through the gateway manager and may send/receive information to or from the offsite location through the cloud monitor. Thus, in one example, the deploying the resource may include instructions provided from the orchestrator. In other examples, the deploying may not involve the orchestrator, rather, the deploying may include changes that occur at the onsite location and/or the offsite location.

In operation, method 500 may further include monitoring (block 515) a bandwidth between the onsite location and the offsite location. The monitoring may occur at the onsite location by measuring local parameters. Examples of local parameters may include a number of completed read operations, a number of completed write operations, a total number of bytes written during a period, a total number of by bytes read during the period, a number of bytes received, a number of bytes sent, a number of packets received, and a number of packets sent. The local parameter may also include an additional bandwidth and a total bandwidth. In certain examples, the monitoring (515) may include use of the gateway manager and may include determining the local parameters as data is transmitted through the local gateway.

The monitoring may occur at the offsite location by measuring remote parameters. Examples of remote parameters may include an additional bandwidth and a total bandwidth. In certain examples, the monitoring (515) may include use of the cloud monitor and may include determining the remote parameters as data is transmitted through the second gateway.

In operation, method 500 may further include modifying (block 520) the bandwidth between the onsite location and the offsite location in response to a change to at least one of the onsite location and the offsite location. Modifying may occur as an orchestrator determines, based on information provided from a gateway manager and/or a cloud monitor, that either too much bandwidth is available or too little bandwidth is available. As such, the orchestrator may provide instructions to one or more of the gateway manager and the cloud monitor to adjust their respective gateways, thereby allowing the bandwidth to be fine-tuned to meet operational objectives.

In certain operations, method 500 may further include monitoring an operational state of at least one of the onsite location and the offsite location. For example, an orchestrator may send and/or receive information to or from the gateway manager and/or the cloud monitor. The information may include data indicative of how a specific device is functioning, how a network is functioning, data transference therebetween, and/or other data indicative of the operational state of the locations. In response to the operational state of the locations, the orchestrator may adjust one or more aspects of the onsite location and/or the offsite location.

In certain operations, method 500 may further include tracking a number of virtual machines at the offsite location. The cloud monitor may determine the number of virtual machines and may send such information to the orchestrator. In response to the number of virtual machines, the orchestrator may provide instructions to one or more of the gateway manager and the cloud monitor to adjust one or more aspects of the onsite location and/or the offsite location.

In operation, method 500 may further include assigning a weight to each connection between the onsite location and the offsite location. By assigning a weight to each connection, the bandwidth requirements may be determined, and components of the onsite location and the offsite location adjusted accordingly.

In operation, method 500 may further include adding one or more additional connections between the onsite location and the offsite location if a desired bandwidth is not satisfied. For example, if a desired bandwidth is determined to be insufficient, an additional connection may be added, thereby increasing the available bandwidth and improving the operability of the communication between the onsite location and the offsite location. By allowing for the dynamic adjustment of properties of the onsite and the offsite location, the transference of data therebetween may be fine-tuned for improved operation.

Figure 6:
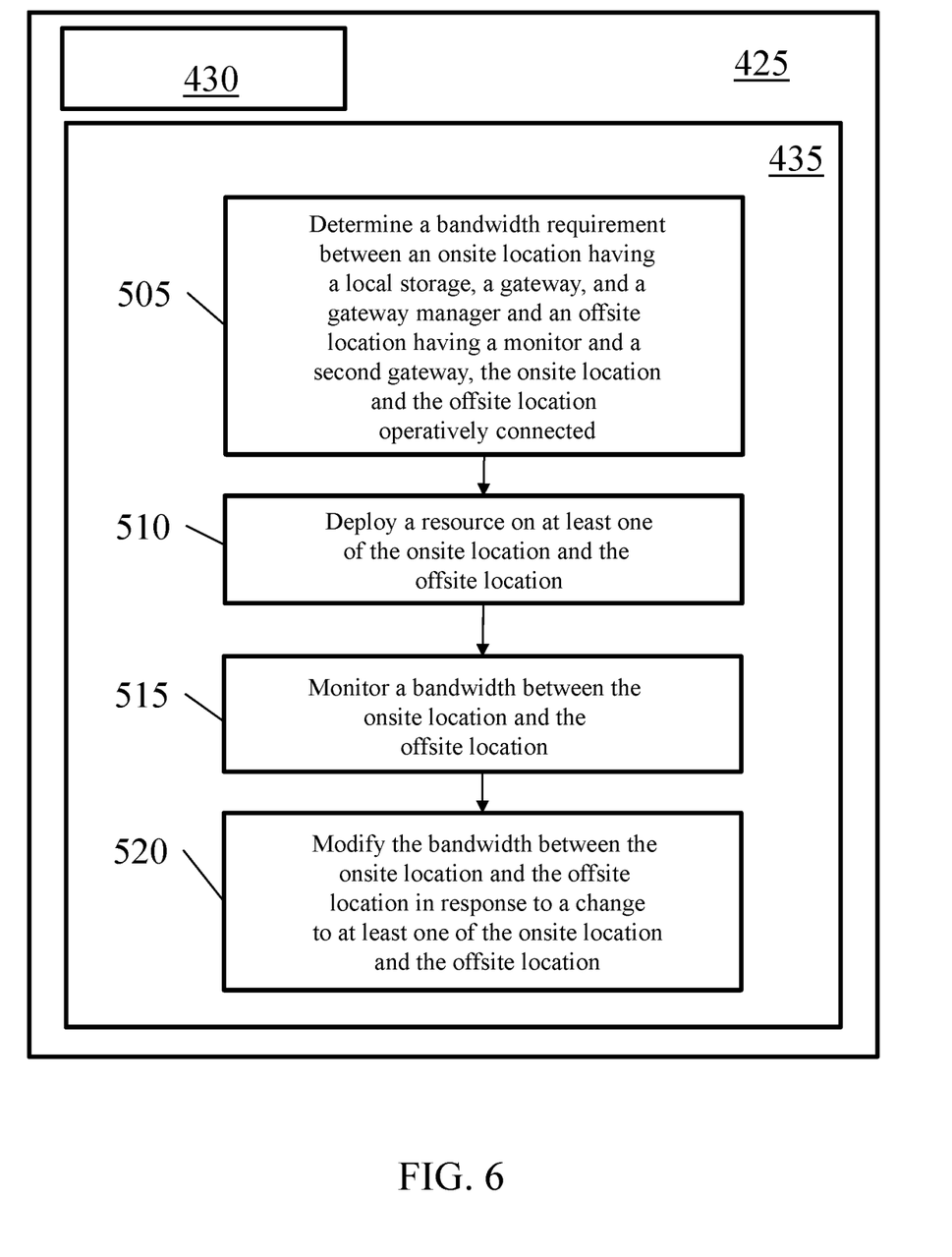
FIG. 6 is an example computing device with a hardware processor and accessible machine-readable instructions, according to one or more examples of the present disclosure.

Turning now to FIG. 6, an example computing device with a hardware processor and accessible machine-readable instructions is shown in accordance with one or more examples of the present disclosure. FIG. 6 provides similar structural components discussed above with respect to FIG. 4, and as such, for purposes of clarity, only the differences in the figures will be discussed herein. FIG. 6 provides an example computing device 425, with a hardware processor 430, and accessible machine-readable instructions stored on a machine-readable medium 435 for managing data as discussed above with respect to one or more disclosed example implementations. FIG. 4 illustrates computing device 425 configured to perform the flow described in blocks 505, 510, 515, and 520, discussed in detail with respect to FIG. 5. Computing device 425 may further be used as an orchestrator, thereby allowing the orchestrator to implement one or more aspects of the flow described in blocks 505, 510, 515, and 520. However, computing device 425 may also be configured to perform the flow of other methods, techniques, functions, or processes described in this disclosure.

Figure 7:
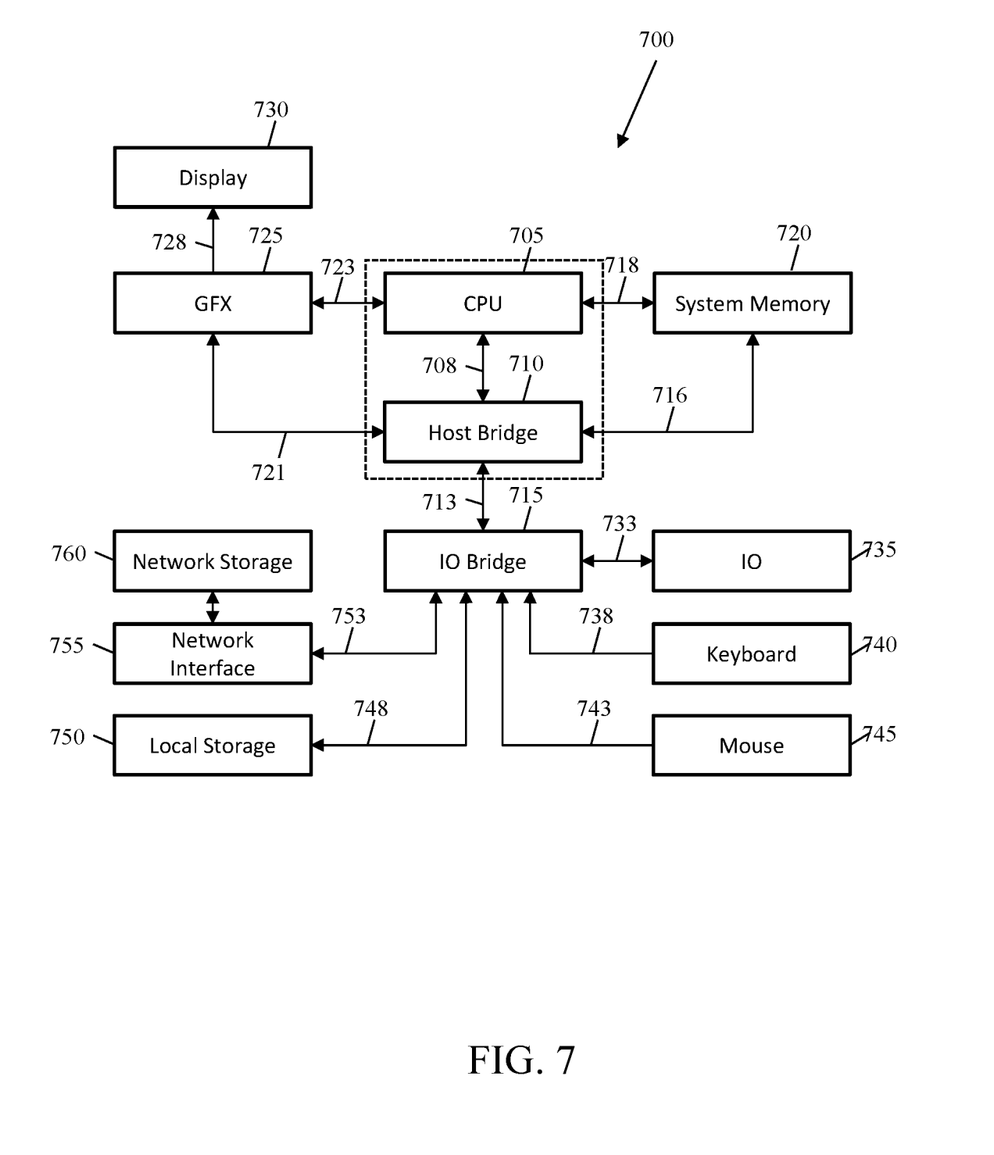
FIG. 7 is a schematic representation of a computer processing device that may be used to implement functions and processes, according to one or more examples of the present disclosure.

Referring now to FIG. 7, a schematic representation of a computer processing device 700 that may be used to implement functions and processes in accordance with one or more examples of the present disclosure is shown. FIG. 7 illustrates a computer processing device 700 that may be used to implement the systems, methods, and processes of this disclosure. For example, computing device 700 illustrated in FIG. 7 could represent a client device or a physical server device and include either hardware or virtual processor(s) depending on the level of abstraction of the computing device. In some instances (without abstraction), computing device 700 and its elements, as shown in FIG. 7, each relate to physical hardware. Alternatively, in some instances one, more, or all of the elements could be implemented using emulators or virtual machines as levels of abstraction. In any case, no matter how many levels of abstraction away from the physical hardware, computing device 700 at its lowest level may be implemented on physical hardware. In one implementation, computing device 700 may allow a subscriber to remotely access one or more data centers. Similarly, the management tool used by the subscriber may include a software solution that runs on such a computing device 700.

FIG. 7 shows a computing system 700 in accordance with one or more examples of the present disclosure. Computing system 700 may be used to implement aspects of the present disclosure, such as an orchestrator, a gateway manager, a cloud monitor, a local storage, a cloud-based storage, or any other device that may be used implementing the systems and methods for managing data discussed herein. Computing system 700 may include one or more central processing units (singular "CPU" or plural "CPUs") 705 disposed on one or more printed circuit boards (not otherwise shown). Each of the one or more CPUs 705 may be a single-core processor (not independently illustrated) or a multi-core processor (not independently illustrated). Multi-core processors typically include a plurality of processor cores (not shown) disposed on the same physical die (not shown) or a plurality of processor cores (not shown) disposed on multiple die (not shown) that are collectively disposed within the same mechanical package (not shown). Computing system 700 may include one or more core logic devices such as, for example, host bridge 710 and input/output ("IO") bridge 715.

CPU 705 may include an interface 708 to host bridge 710, an interface 718 to system memory 720, and an interface 723 to one or more IO devices, such as, for example, graphics processing unit ("GFX") 725. GFX 725 may include one or more graphics processor cores (not independently shown) and an interface 728 to display 730. In certain embodiments, CPU 705 may integrate the functionality of GFX 725 and interface directly (not shown) with display 730. Host bridge 710 may include an interface 708 to CPU 705, an interface 713 to IO bridge 715, for embodiments where CPU 705 does not include interface 718 to system memory 720, an interface 716 to system memory 720, and for embodiments where CPU 705 does not include integrated GFX 725 or interface 723 to GFX 725, an interface 721 to GFX 725. One of ordinary skill in the art will recognize that CPU 705 and host bridge 710 may be integrated, in whole or in part, to reduce chip count, motherboard footprint, thermal design power, and power consumption. IO bridge 715 may include an interface 713 to host bridge 710, one or more interfaces 733 to one or more IO expansion devices 735, an interface 738 to keyboard 740, an interface 743 to mouse 745, an interface 748 to one or more local storage devices 750, and an interface 753 to one or more network interface devices 755.

Each local storage device 750 may be a solid-state memory device, a solid-state memory device array, a hard disk drive, a hard disk drive array, or any other non-transitory computer readable medium. Each network interface device 755 may provide one or more network interfaces including, for example, Ethernet, Fibre Channel, WiMAX, Wi-Fi, Bluetooth, or any other network protocol suitable to facilitate networked communications. Computing system 700 may include one or more network-attached storage devices 760 in addition to, or instead of, one or more local storage devices 750. Network-attached storage device 760 may be a solid-state memory device, a solid-state memory device array, a hard disk drive, a hard disk drive array, or any other non-transitory computer readable medium. Network-attached storage device 760 may or may not be collocated with computing system 700 and may be accessible to computing system 700 via one or more network interfaces provided by one or more network interface devices 755.

One of ordinary skill in the art will recognize that computing system 700 may include one or more application specific integrated circuits ("ASICs") that are configured to perform a certain function, such as, for example, hashing (not shown), in a more efficient manner. The one or more ASICs may interface directly with an interface of CPU 705, host bridge 760, or IO bridge 715. Alternatively, an application-specific computing system (not shown), sometimes referred to as mining systems, may be reduced to only those components necessary to perform the desired function, such as hashing via one or more hashing ASICs, to reduce chip count, motherboard footprint, thermal design power, and power consumption. As such, one of ordinary skill in the art will recognize that the one or more CPUs 705, host bridge 710, IO bridge 715, or ASICs or various sub-sets, super-sets, or combinations of functions or features thereof, may be integrated, in whole or in part, or distributed among various devices in a way that may vary based on an application, design, or form factor in accordance with one or more example embodiments. As such, the description of computing system 700 is merely exemplary and not intended to limit the type, kind, or configuration of components that constitute a computing system suitable for performing computing operations, including, but not limited to, hashing functions. Additionally, one of ordinary skill in the art will recognize that computing system 700, an application specific computing system (not shown), or combination thereof, may be disposed in a standalone, desktop, server, or rack mountable form factor.

One of ordinary skill in the art will recognize that computing system 700 may be a cloud-based server, a server, a workstation, a desktop, a laptop, a netbook, a tablet, a smartphone, a mobile device, and/or any other type of computing system in accordance with one or more example embodiments.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

While the present teachings have been described in conjunction with various examples, it is not intended that the present teachings be limited to such examples. The above-described examples may be implemented in any of numerous ways.

Also, the technology described herein may be embodied as a method, of which at least one example has been provided. The acts performed as part of the method may be ordered in any suitable way. Accordingly, examples may be constructed in which acts are performed in an order different than illustrated, which may include performing some acts simultaneously, even though shown as sequential acts in illustrative examples.

Advantages of one or more example embodiments may include one or more of the following:

In one or more examples, systems and methods disclosed herein may be used to improve connections between onsite locations and offsite locations.

In one or more examples, systems and methods disclosed herein may be used to provide systems for monitoring the connection between onsite locations and offsite locations and adjusting aspects of the locations as a result to changes in the locations.

In one or more examples, systems and methods disclosed herein may be used to dynamically fine-tune the bandwidth between onsite and offsite locations.

In one or more examples, systems and methods disclosed herein may be used to provide local storage geographically separated from cloud-based storage services, which may decrease cost and increase efficiency of the implementation.

Not all embodiments will necessarily manifest all these advantages. To the extent that various embodiments may manifest one or more of these advantages, not all of them will do so to the same degree.

While the claimed subject matter has been described with respect to the above-noted embodiments, those skilled in the art, having the benefit of this disclosure, will recognize that other embodiments may be devised that are within the scope of claims below as illustrated by the example embodiments disclosed herein. Accordingly, the scope of the protection sought should be limited only by the appended claims.

What is claimed is:

1. A method comprising:
monitoring, by a system comprising a hardware processor, a first location having a local storage volume and a local gateway, wherein the local storage volume contains data accessible by a host;
monitoring, by the system, a second location having a first remote storage volume and a remote gateway, wherein the first remote storage volume was mounted at the second location responsive to creation of the local storage volume at the first location, and the monitoring of the second location comprises monitoring reads and/or writes of storage volumes;
determining, by the system based on the monitoring of the first location and the monitoring of the second location, a bandwidth requirement for a second remote storage volume at the second location;
configuring, by the system, the local gateway and the remote gateway for the bandwidth requirement; and
adjusting, by the system, the local gateway and the remote gateway when the bandwidth requirement changes.

2. The method of claim 1, further comprising:
creating, by the system, the local storage volume at the first location; and
mounting, by the system, the first remote storage volume at the second location responsive to the creation of the local storage volume at the first location.

3. The method of claim 2, wherein the mounting the first remote storage volume at the second location comprises mounting the local storage volume to a virtual machine at the second location, the first remote storage volume comprising the virtual machine.

4. The method of claim 3, wherein the second remote storage volume comprises a new virtual machine added to the second location.

5. The method of claim 1, wherein the monitoring the first location comprises determining a local parameter representing an amount of reads and/or writes of the local storage volume.

6. The method of claim 5, wherein the local parameter comprises at least one of a number of completed read operations, a number of completed write operations, a total number of bytes written during a period, or a total number of by bytes read during the period.

7. The method of claim 4, wherein the monitoring the second location comprises determining a remote parameter representing a quantity of new virtual machines added at the second location.

8. The method of claim 1, wherein the adjusting the local gateway and the remote gateway comprises adding a new connection between the first location and the second location.

9. A system comprising:
a local storage disposed at an onsite location and comprising a local storage volume to store data accessible by a host;
a gateway at the onsite location;
a processor; and
a non-transitory storage medium storing orchestrator instructions executable on the processor to:
mount the local storage volume to a remote storage volume at an offsite location responsive to creation of the local storage volume at the onsite location;
monitor the onsite location and the offsite location, wherein the offsite location is monitored based on monitoring reads and/or writes of storage volumes; and
dynamically adjust a bandwidth between the gateway and the offsite location based on monitoring the onsite location and the offsite location.

10. The system of claim 9, wherein the offsite location comprises a cloud-based computing service and a cloud monitor operatively connected to a second gateway and a virtual machine.

11. The system of claim 9, further comprising a virtual private network connecting the onsite location to the offsite location.

12. The system of claim 10, wherein the mounting the local storage volume to the remote storage volume at the offsite location comprises mounting the local storage volume to the virtual machine.

13. The system of claim 9, wherein the monitoring the onsite location comprises determining a local parameter representing an amount of reads and/or writes of the local storage volume.

14. The system of claim 13, wherein the local parameter comprises at least one of a number of completed read operations, a number of completed write operations, a total number of bytes written during a period, or a total number of by bytes read during the period.

15. A non-transitory computer readable medium comprising instructions stored thereon that, when executed by one or more processing units cause the one or more processing units to:
determine a bandwidth requirement between an onsite location having a local storage, a first gateway, and a gateway manager and an offsite location having a cloud monitor and a second gateway, the onsite location and the offsite location operatively connected, wherein the local storage comprises a local storage volume to store data accessible by a host, and the offsite location has a remote storage volume mounted at the offsite location responsive to creation of the local storage volume at the onsite location;
deploy a resource on at least one of the onsite location and the offsite location;
monitor a bandwidth between the onsite location and the offsite location, the monitoring of the bandwidth comprising monitoring reads and/or writes of storage volumes at the offsite location; and
modify the bandwidth between the onsite location and the offsite location in response to a change to at least one of the onsite location and the offsite location.

16. The non-transitory computer readable medium of claim 15, further comprising instructions stored thereon that, when executed by the one or more processing units cause the one or more processing units to mount the remote storage volume at the offsite location by mounting the local storage volume to a virtual machine at the offsite location, the remote storage volume comprising the virtual machine.

17. The non-transitory computer readable medium of claim 15, wherein the monitoring of the bandwidth comprising determining a local parameter representing an amount of reads and/or writes of the local storage volume.

18. The non-transitory computer readable medium of claim 15, further comprising instructions stored thereon that, when executed by the one or more processing units cause the one or more processing units to track a number of virtual machines at the offsite location.

19. The non-transitory computer readable medium of claim 15, further comprising instructions stored thereon that, when executed by the one or more processing units cause the one or more processing units to assign a weight to each connection between the onsite location and the offsite location.

20. The non-transitory computer readable medium of claim 19, further comprising instructions stored thereon that, when executed by the one or more processing units cause the one or more processing units to add an additional connection between the onsite location and the offsite location in response to the monitoring of the bandwidth.

\* \* \* \* \*